3,541,086
6-HALO-9,11,21-TRICHLORO - 16,17-ALKYLIDENE-
DIOXYPREGNANES AND DERIVATIVES AND
COMPOSITIONS THEREOF
John H. Fried, Palo Alto, Calif., assignor to Syntex Corporation, Panama, Panama, a corporation of Panama
No Drawing. Filed Apr. 22, 1968, Ser. No. 723,274
Int. Cl. C07c 173/00
U.S. Cl. 260—239.55            2 Claims

ABSTRACT OF THE DISCLOSURE $9\alpha,11\beta,21$ - trichloro - $16\alpha,17\alpha$-alkylidenedioxypregn-4-ene-3,20-diones substituted with fluoro or chloro at position C–6α and the pregna-1,4-dienes, -4,6-dienes and -1,4,6 - trienes thereof having topical anti-inflammatory activity.

The present invention relates to novel cyclopentanopolyhydrophenanthrene derivatives and to processes for the preparation thereof.

More specifically, the present invention pertains to $9\alpha,11\beta,21$ - trichloro - $16\alpha,17\alpha$-alkylidenedioxypregn-4-ene-3,20-diones substituted at position C–6α with fluoro or chloro and to the corresponding pregna-1,4-dienes, -4,6-dienes and -1,4,6-trienes thereof. The compounds of this invention are represented by the following structural formula:

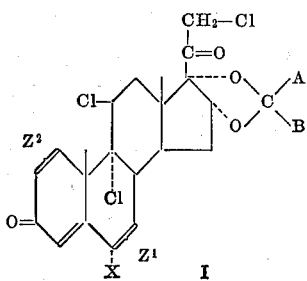

wherein, each of A and B is hydrogen or lower alkyl;
or
A and B taken together are tetramethylene or pentamethylene;
$Z^1$ is a carbon-carbon single bond or a carbon-carbon double bond;
$Z^2$ is a carbon-carbon single bond or a carbon-carbon double bond; and X is fluoro or chloro.

The term "lower alkyl" includes methyl, ethyl, propyl, butyl, and pentyl.

The foregoing compounds possess an extremely high level of topical anti-inflammatory activity with a lower level of systemic activity. Accordingly, these compounds can be employed for treating allergies and dermatological inflammatory conditions, such as contact dermatitis, eczematous dermatitis, pruritus ani, and the like, with a minimum, if any, systemic derangement and/or effect. These compounds may be administered topically in the form of solutions, suspensions, creams, ointments, powders, and the like. Generally, in view of their high activity, the compositions will contain up to about 0.25%, by weight, of active steroid. As is customary, the precise dosage may be varied depending upon the condition being treated and for some of these, such as maintenance therapy of large areas or occulsive dressing therapy, compositions containing about 0.01% or less, by weight, are preferred. Various other therapeutic agents, as for example, antibiotics such as neomycin, may of course be included in suitable compositions.

The compounds of the present invention may be prepared chemically in a number of ways. Thus, a $16\alpha,17\alpha$-alkylidenedioxypregna - 4,9(11) - dien-21-ol-3,20-dione 21-acetate substituted at C–6α with fluoro or chloro or the corresponding -1,4,9(11)-triene, -4,6,9(11)-triene or -1,4,6,9(11) - tetraene, is chlorinated, as with chlorine in pyridine and chloroform to yield the corresponding $9\alpha,11\beta$-dichloro compound. The C–21 position is chlorinated after a basic hydrolysis of the 21-acetoxy group to yield the $9\alpha,11\beta$-dichloro-21-hydroxy intermediate which is converted to the corresponding 21-alkyl or -arylsulfonate, such as the mesylate or tosylate, which when treated with lithium chloride yields the corresponding $9\alpha,11\beta,21$-trichloro-$16\alpha,17\alpha$-alkylidenedioxypregn - 4 - ene - 3,20-dione substituted at C–6α with fluoro or chloro, or in those cases in which a -1,4,9(11)-triene, -4,6,9(11)-triene or -1,4,6,9(11)-tetraene is employed as the starting material, the corresponding $9\alpha,11\beta,21$ - trichloro - $16\alpha,17\alpha$-alkylidenedioxypregna-1,4-diene - 3,20-dione, $9\alpha,11\beta,21$-trichloro-$16\alpha,17\alpha$ - alkylidenedioxypregna-4,6-diene-3,20-dione or $9\alpha,11\beta,21$ - trichloro-$16\alpha,17\alpha$-alkylidenedioxypregna-1,4,6-triene-3,20 - dione substituted at C–6 with fluoro or chloro is respectively obtained.

Alternatively, a $16\alpha,17\alpha$ - alkylidenedioxypregna-4,9-(11)-dien-20-ol-3,20-dione substituted at position C–6α with fluoro or chloro, or -1,4,9(11)-triene, -4,6,9(11)-triene or -1,4,6,9(11)-tetraene thereof is first converted to the 21-chloro derivative, via the 21-chlorination process described above, and the resulting 21-chloro-4,9(11)-diene derivative, -1,4,9(11)-triene, -4,6,9(11)-triene or -1,4,6,9(11)-tetraene thereof, is selectively chlorinated at positions C–9 and C–11 to yield the corresponding $9\alpha,11\beta,21$-trichloro - $16\alpha,17\alpha$ - alkylidenedioxypregn-4-ene-3,20-dione substituted at position C–6 with fluoro or chloro or -1,4-diene, -4,6-diene or -1,4,6-triene thereof.

The processes are illustrated by the following reaction schemes:

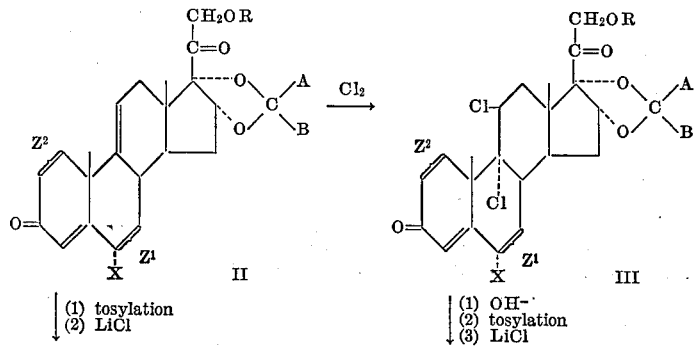

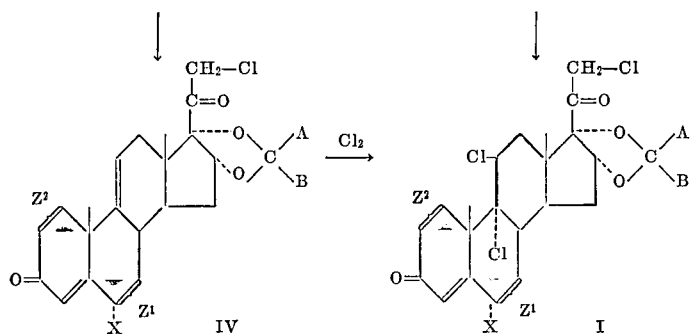

In the foregoing, A, B, Z¹, Z² and X are as previously defined and R is either hydrogen or acyl, e.g. acetyl, R being H in the sequence II→IV→I and R being acyl in the sequence II→III→I.

Particularly preferred compounds of the present invention include: 6α-fluoro-9α,11β,21-trichloro-16α,17α-isopropylidenedioxypregn - 4 - ene-3,20-dione, 6α - fluoro-9α-11β,21 - trichloro - 16α,17α - isopropylidenedioxypregna-1,4-diene-3,20-dione, 6 - fluoro - 9α,11β - 21-trichloro-16α, 17α-isopropylidenedioxypregna - 4,6 - diene-3,20-dione, 6-fluoro - 9α,11β,21 - trichloro - 16α,17α - isopropylidenedioxypregna - 1,4,6 - triene-3,20-dione, 6α,9α,11β,21-tetrachloro - 16α,17α - isopropylidenedioxypregn - 4 - ene - 3, 20-dione, 6α,9α,11β,21 - tetrachloro - 16α,17α - isopropylidenedioxypregna-1,4-diene-3,20-dione, 6,9α,11β,21 - tetrachloro - 16α,17α - isopropylidenedioxypregna - 4,6 - diene-3,20-dione, and 6,9α,11β,21 - tetrachloro - 16α,17α-isopropylidenedioxypregna-1,4,6-triene-3,20-dione, and the 16α, 17α-cyclopentylidenedioxy and 16α,17α-cyclohexylidenedioxy derivatives thereof.

The following examples will serve to further typify the nature of this invention. These examples are presented, however, solely for the purpose of illustration and should not, therefore, be considered as a limitation on the scope of this invention.

EXAMPLE I (A) Nineteen grams of 6α-fluoro-16α,17α-isopropylidenedioxy - 21 - acetoxypregna - 1,4,9(11) - triene - 3,20-dione are suspended in 152 ml. of methanol to which has been added 475 mg. of sodium in 38 ml. of methanol. This reaction mixture is stirred for 45 minutes at from about 20° to 25° C. and then neutralized with acetic acid. After evaporation to dryness, the residue is dissolved in methylene chloride and this solution is washed with water, dried over sodium sulfate and concentrated. Addition of methanol to the concentrate followed by further concentration yields a slurry which is filtered. The solid thus collected is washed with cold methanol and dried to yield 6α - fluoro - 16α,17α-isopropylidenedioxypregna-1,4,9(11)-trien-21-ol-3,20-dione, M.P. 245° C. (dec), $[\alpha]_D +24°$.

(B) To a cooled solution of 3.4 g. of 6α-fluoro-16α,17α-isopropylidenedioxypregna - 1,4,9(11) - trien - 21 - ol-3,20-dione in 20 ml. of 9:1 chloroform:pyridine is added to small portions 1.4g. of tosyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in acetone. This acetone solution is added to a refluxing suspension of 10 g. of lithium chloride in 50 ml. of dimethylformamide. After refluxing for five hours, the mixture is cooled and poured into water. The solid which forms is collected by filtration, dried and recrystallized from acetone and hexane to yield 6α-fluoro-16α,17α-isopropylidenedioxy - 21 - chloropregna - 1,4,9(11) - triene-3,20-dione.

(C) Five grams of 6α-fluoro-16α,17α-isopropylidenedioxy - 21 - chloropregna - 1,4,9(11) - triene - 3,20 - dione are dissolved in 50 ml. of chloroform containing 5 ml. of pyridine. The mixture is held at 0° for 15 minutes while a stream of chlorine is bubbled through. The mixture is then poured into a 10% aqueous sulfuric acid solution and the organic layer separated. This layer is washed with 5% aqueous sodium bicarbonate and water to neutrality, dried over sodium sulfate and evaporated to dryness to yield 6α-fluoro-9α-11β, 21-trichloro-16α, 17α-isopropylidenedioxypregna-1,4-diene-3,20-dione.

In a similar fashion, 6α-fluoro-9α,11β,21-trichloro-16α, 17α-isopropylidenedioxypregn-4-ene-3,20-dione, 6-fluoro-9α,11β,21 - trichloro - 16α,17α - isopropylidenedioxypregna-4,6-diene-3,20-dione, 6-fluoro-9α,11β,21-trichloro-16α,17α - isopropylidenedioxypregna - 1,4,6 - triene-3,20 - dione, 6α,9α,11β,21-tetrachloro-16α,17α-isopropylidenedioxypregn-4-ene-3,20-dione, 6α,9α,11β-21-tetrachloro - 16α,17α - isopropylidenedioxypregna - 1,4 - diene-3,20-dione, 6,9α,11β,21-tetrachloro - 16α,17α - isopropylidenedioxypregna-4,6-diene-3,20-dione, and 6,9α, 11β,21-tetrachloro - 16α,17α - isopropylidenedioxypregna - 1,4,6-triene-3,20-dione are prepared from 6α-fluoro-16α,17α-isopropylidenedioxy - 21 - acetoxypregna - 4,9(11)-diene-3,20-dione, 6-fluoro - 16α,17α - isopropylidenedioxy-21 - acetoxypregna - 4,6-9(11)-triene-3,20-dione, 6-fluoro-16α,17α - isopropylidenedioxy - 21 - acetoxypregna-1,4,6,9(11) - tetraene - 3,20-dione, 6α-chloro-16α,17α-isopropylidenedioxy - 21 - acetoxypregna - 4,9(11) - diene-3,20-dione, 6α-chloro - 16α,17α - isopropylidenedioxy-21-acetoxypregna - 1,4,9(11)-triene-3,20-dione, 6-chloro-16α, 17α - isopropylidenedioxy - 21 - acetoxypregna - 4,6,9 (11)-triene-3,20-dione, and 6-chloro-16α,17α-isopropylidenedioxy - 21 - acetoxypregna - 1,4,6,9(11) - tetraene-3,20-dione, respectively.

EXAMPLE II

By subjecting 6α-fluoro-16α,17α-isopropylidenedioxy-21 - acetoxypregna - 1,4,9(11) - triene - 3,20 - dione to the procedure of Part C of Example I, there is obtained 6α - fluoro - 9α,11β - dichloro - 16α,17α - isopropylidenedioxy-21-acetoxypregna-1,4-diene-3,20-dione. This compound is then subjected to the procedures of Parts A and B of Example I to yield 6α-fluoro-9α,11β-21-trichloro-16α17α - isopropylidenedioxypregna - 1,4 - diene - 3,20-dione, identical in all physical properties to that obtained according the sequence of Example I.

In a similar fashion, 6α-fluoro-9α,11β,21-trichloro-16α,17α - cyclopentylidenedioxypregna - 1,4 - diene - 3,20-dione, 6α-fluoro-9α,11β-21-trichloro-16α,17α-cyclohexylidenedioxypregna-1,4-diene-3,20-dione, 6-fluoro-9α,11β,21-trichloro - 16α,17α - isopropylidenedioxypregna - 1,4,6-triene-3,20-dione, 6α,9α,11β-21 - tetrachloro - 16α,17α-isopropylidenedioxypregn-4-ene-3,20-dione, 6α,9α,11β,21-tetrachloro - 16α,17α - isopropylidenedioxypregna - 1,4 - diene-3,20-dione, 6α,9α-11β,21 - tetrachloro - 16α,17α-cyclohexylidenedioxypregna-1,4-diene-3,20-dione, 6,9α,11β,21-tetrachloro - 16α,17α - cyclopentylidenedioxypregna - 4,6-diene - 3,20 - dione, and 6,9α,11β,21-tetrachloro-16α,17α-isopropylidenedioxypregna - 1,4,6 - triene - 3,20-dione are prepared from 6α-fluoro-16α,17α-cyclopentylidenedioxy-21-acetoxypregna-1,4,9(11)-triene-3,20-dione, 6α - fluoro-16α,17α - cyclohexylidenedioxy - 21 - acetoxypregna-1,4,9(11) - triene-3,20-dione, 6-fluoro-16α,17α-isopropylidenedioxy - 21 acetoxypregna - 1,4,6,9(11) - tetraene-3,20 - dione, 6α - chloro - 16α,17α - isopropylidenedioxy-21 - acetoxypregna - 4,9(11) - diene - 3,20 - dione, 6α-chloro - 16α,17α-isopropylidenedioxy - 21 - acetoxypregna-1,4,9(11)-triene-3,20-dione, 6α-chloro-16α,17α-cyclohexylidenedioxy - 21 - acetoxypregna - 1,4,9(11) - triene-3,20-dione, 6-chloro - 16α,17α - cyclopentylidenedioxy 21-acetoxypregna - 4,6,9(11) - triene - 3,20 - dione, and 6-chloro - 16α,17α - isopropylidenedioxy - 21 - acetoxypregna-1,4,6,9(11)-tetraene-3,20-dione.

EXAMPLE III

By subjecting 6-chloro-16α,17α-ethylidenedioxy-21-acetoxypregna-4,6,9(11)-triene-3,20-dione to the procedure of Example I, there is obtained 6,9α,11β,21-tetrachloro-16α,17α-ethylidenedioxypregna-4,6-diene-3,20-dione.

EXAMPLE IV

Seventy-five milligrams of 6α-fluoro-9α,11β,21-trichloro-16α,17α-isopropylidenedioxypregna - 1,4 - diene-3,20-dione is dissolved with stirring at 80° C. in 39.38 g. of propylene glycol. There is then added with stirring a filtered melt of 75 g. of stearic acid, 39 g. of Span 60, 7.5 g. of Span 80, 21 g. of Tween 60 and 375 mg. of propylparaben. There is next added a solution of 1.35 g. of methylparaben in 555 g. of sterile deionized water. The mixture is allowed to cool to a temperature of 25° to 30° while stirring is continued, solidification occurring at about 50° C. There is then slowly added with stirring a solution of 75 mg. of anhydrous citric acid in 15.5 g. of sterile deionized water. The weight of this mixture is then adjusted to 750 g. with sterile deionized water to produce a 0.01% cream suitable for maintenance therapy and occlusive dressing therapy of various dermatoses.

By employing 187.5 mg. of the steroid in the foregoing procedure, a 0.025% cream is obtained, suitable for adjunctive therapy of acute or chronic dermatoses.

EXAMPLE V

Twenty - five milligrams of 6α,9α,11β,21 - tetrachloro-16α,17α - isopropylidenedioxypregna-1,4-diene-3,20-dione, which has been milled on a ball mill to a particle size of under 10 microns, and 575 mg. of neomycin sulfate, similarly micronized, are added to 3.4 g. of white petrolatum, USP, which has been melted at a temperature of 50 to 55° C. This mixture is thoroughly mixed and passed through an Eppenbach colloid mill. The mill is then rinsed with 96 g. of melted white petrolatum which is divided into four portions. These rinsings are combined with the principal mixture and the entire bulk is stirred until it has attained room temperature. The resulting 0.05% ointment is suitable for treatment of inflammatory dermatoses complicated by infection where an emollient effect or lubrication is desirable.

EXAMPLE VI

Ninety-five milliliters of propylene glycol, USP, are heated at 90° C. for 20 minutes and then cooled to 60° C. In this liquid are dissolved with agitation 10 mg. of 6-fluoro - 9α,11β,21-trichloro-16α,17α-isopropylidenedioxypregna-1,4,6-triene-3,20-dione and 10 mg. of anhydrous citric acid, USP. The volume of the resulting solution is adjusted to a total of 100 ml. with additional propylene glycol and allowed to attain temperature. The resulting 0.01% solution may be employed for the treatment of inflammatory dermatoses in intertriginous or hairy sites.

What is claimed is:

1. A compound of the formula:

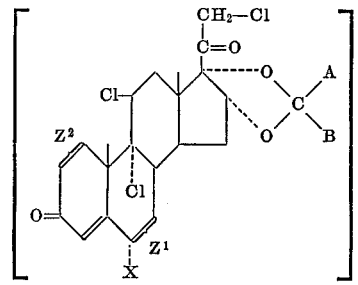

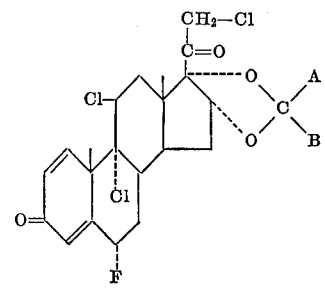

wherein, each of A and B is hydrogen or lower alkyl; or

A and B taken together are tetramethylene or pentamentylene.

2. The compound according to claim 1 wherein it is 6α-fluoro-9α,11β,21-trichloro - 16α,17α - isopropylidenedioxypregna-1,4-diene-3,20-dione.

References Cited

UNITED STATES PATENTS

| | | | |
|---|---|---|---|
| 3,201,391 | 8/1965 | Bowers | 260—239.55 |
| 3,211,727 | 10/1965 | Heller et al. | 260—239.55 |
| 3,236,868 | 2/1966 | Bowers | 260—397.45 |
| 3,409,613 | 11/1968 | Fried | 260—239.55 |

LEWIS GOTTS, Primary Examiner

E. G. LOVE, Assistant Examiner

U.S. Cl. X.R.

424—241